United States Patent [19]
Smith

[11] Patent Number: 4,964,542
[45] Date of Patent: Oct. 23, 1990

[54] FROZEN BEVERAGE DISPENSER

[75] Inventor: Dell W. Smith, Los Angeles, Calif.

[73] Assignee: Bar-Master International, Los Angeles, Calif.

[21] Appl. No.: 270,539

[22] Filed: Nov. 14, 1988

[51] Int. Cl.$^5$ .............................................. B65D 88/54
[52] U.S. Cl. ................................ 222/146.6; 222/318;
  222/333; 222/412; 222/424; 222/529
[58] Field of Search ................... 222/146.2, 146.1, 318,
  222/333, 412, 413, 411, 424, 501, 518, 527, 529, 537

[56] References Cited

U.S. PATENT DOCUMENTS

| | | | |
|---|---|---|---|
| 2,645,524 | 7/1953 | Kelly | 222/318 X |
| 3,141,573 | 7/1964 | Patch et al. | 222/146.6 X |
| 3,904,085 | 9/1975 | Bartyan et al. | 222/146.6 X |
| 4,711,376 | 12/1987 | Manfroni | 222/146.1 |

OTHER PUBLICATIONS

Model 341 Flow Chart.

*Primary Examiner*—David H. Bollinger
*Attorney, Agent, or Firm*—Harris, Kern, Wallen & Tinsley

[57] ABSTRACT

A frozen beverage dispenser for use with a liquid/ice slurry machine which freezes a liquid to form a slurry and continuously circulates the slurry through the machine for maintaining the slurry in the desired state. The dispenser includes a nozzle connected to the machine by a flexible line having concentric inner and outer tubes, with the slurry being continuously circulated through the line between the machine and the nozzle. The nozzle has a flow path therethrough with the line connected at one end of the flow path and with a valve for controlling flow out the other end, and a bypass passage between the inner and outer tubes for return flow of the slurry when the valve is closed.

13 Claims, 3 Drawing Sheets

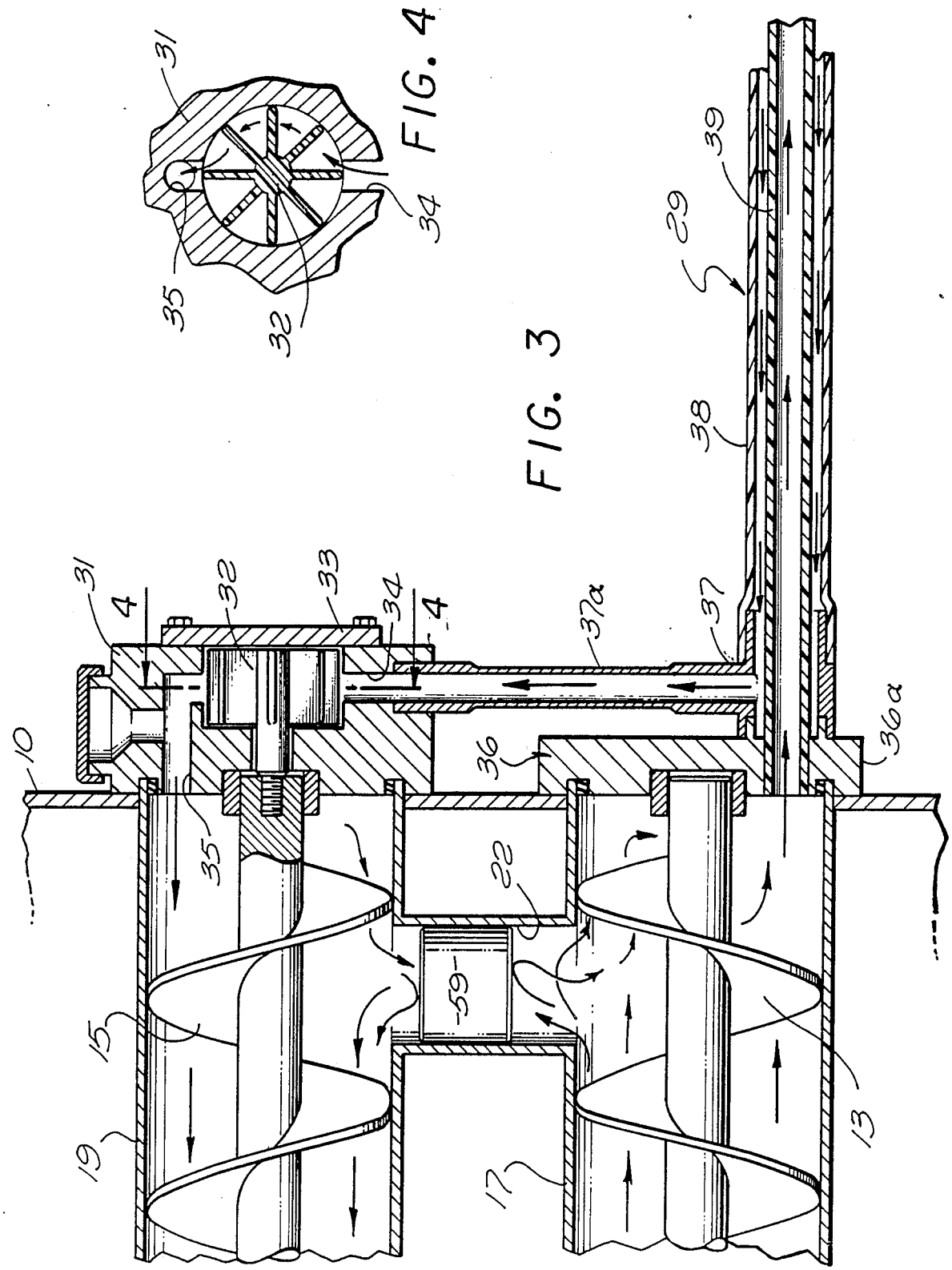

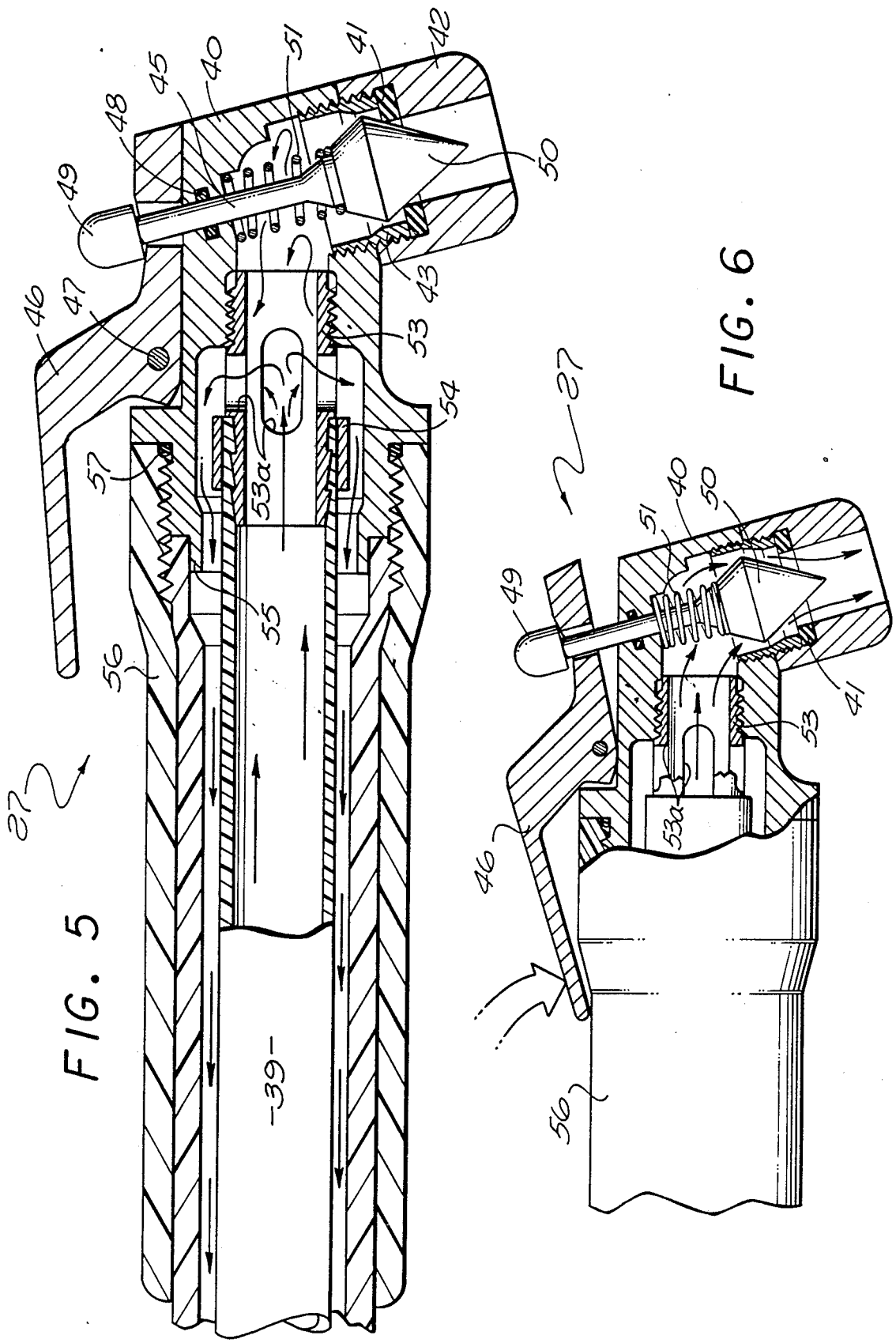

FROZEN BEVERAGE DISPENSER

BACKGROUND OF THE INVENTION

This invention relates to frozen beverage machines and in particular, to a new and improved dispenser for frozen beverages.

A variety of frozen beverages are being produced by machines which convert a liquid into a liquid/ice mix or slurry consisting principally of small ice crystals. The composition and consistency of the product may vary from machine to machine. Frozen beverage soft drinks are sold under a number of trade names, including "Slurpy", "Icee", and "Slush Puppy". Frozen cocktails are also being produced by this type of machine, including the frozen margarita and the frozen daiquiri.

The typical machine includes a recirculating path for the material and a refrigerator for freezing the liquid as it moves along the path. Provision is made for introducing make up liquid in the circulating path, and for withdrawing the slurry into a cup or glass. A typical machine of this type is shown in FIG. 1, and will be described in greater detail herein below.

The product is dispensed from this type of machine by operating a valve mounted directly on the machine, and this mode of operation is entirely satisfactory so far as the condition of the product is concerned. The machines are relatively large and preferably should be located a distance from the point of serving. However, in order to make efficient use of the time required by the server to deliver a drink, the conventional machine should be positioned directly on a counter or below a counter. Positioning a machine on a counter or in back of a counter is aesthetically undesirable and also takes up space normally used for other customer expendables such as table ware, cups and glasses, sauces and napkins, and the like.

For these reasons it is desirable to be able to position the frozen beverage machine in a less congested location while providing for dispensing the frozen product at the serving area. One approach to resolving this problem utilizes a nozzle connected to the machine by two parallel tubes and a pump at the machine driven by a separate motor for moving the product along one tube to the nozzle and along the other tube back to the machine. The nozzle incorporates a normally closed valve, with product being dispensed from the nozzle when the valve is open. In order to obtain reasonable product flow, each hose should have an inside diameter of about ⅜ inch.

This prior design has some disadvantages. Most frozen beverages are served at temperatures well below comfortable ambient room temperatures, a drink typically being served at 25° F. in a room at 74° F. The product cannot simply be transported in a single conduit from the machine to the nozzle since the slurry breaks down due to temperature gain and ice conglomeration, even though the tubing is insulated. Recirculation of the product between the machine and the nozzle is necessary, and for this prior design to be satisfactory, both tubes must be thermally insulated and also mechanically protected. Two such hoses of ⅜ inch inside diameter result in a large and bulky apparatus that presents handling problems as well as being unattractive.

SUMMARY OF THE INVENTION

Accordingly, it is an object of the present invention to provide a new and improved frozen beverage dispenser which permits positioning of the dispensing nozzle a distance from the freezing machine while at the same time overcoming the disadvantages of the present devices. It is a particular object of the invention to provide a frozen beverage dispenser with the nozzle connected to the machine by a single line which does not require thermal insulation. A further object is to provide such a dispenser utilizing concentric inner and outer tubes, with the outgoing product in the inner tube which is an unreinforced thin wall material, and with the returning product in the outer tube which is a mechanically reinforced thick wall material.

It is an additional object of the invention to provide such a beverage dispenser which can be mounted on and operated from a conventional freezing machine without requiring any additional motor or motor control. A particular object of the invention is to provide such a freezing machine utilizing an additional impeller for the circulation of product to the nozzle, with this impeller being connected to and driven along with the auger in the product circulating path in the freezing machine.

Other objects, advantages, features and results will more fully appear in the course of the following description.

The presently preferred embodiment of the frozen beverage dispenser is used with a liquid/ice slurry machine having freezing means for freezing a liquid to form the slurry and circulating means for circulating the liquid and resultant slurry through the freezing means, and including inner and outer concentric tubes forming a flexible line for connecting a nozzle to the machine to create a slurry recirculating path between the nozzle and the machine.

The preferred embodiment further includes an adapter housing for mounting on the machine and carrying an impeller for driving the slurry through the concentric tube line, with the impeller connected to and driven by one of the augers in the freezing machine. Also, another adapter is provided for mounting on the machine in place of the normal dispensing valve for connecting the nozzle line to the freezing machine, preferably with the inner tube of the line being directly connected to the machine and with the outer tube of the line being connected to the impeller attachment.

BRIEF DESCRIPTION OF THE DRAWINGS

FIG. 3 is an enlarged partial sectional view of the apparatus of FIG. 2;

FIG. 4 is a partial sectional view taken along the line 4—4 of FIG. 3;

FIG. 5 is an enlarged partial sectional view of the nozzle end of the apparatus of FIG. 2 with the valve in the closed position; and FIG. 6 is a view similar to that of FIG. 5 with the valve in the open position.

DESCRIPTION OF THE PREFERRED EMBODIMENT

Figure 1:
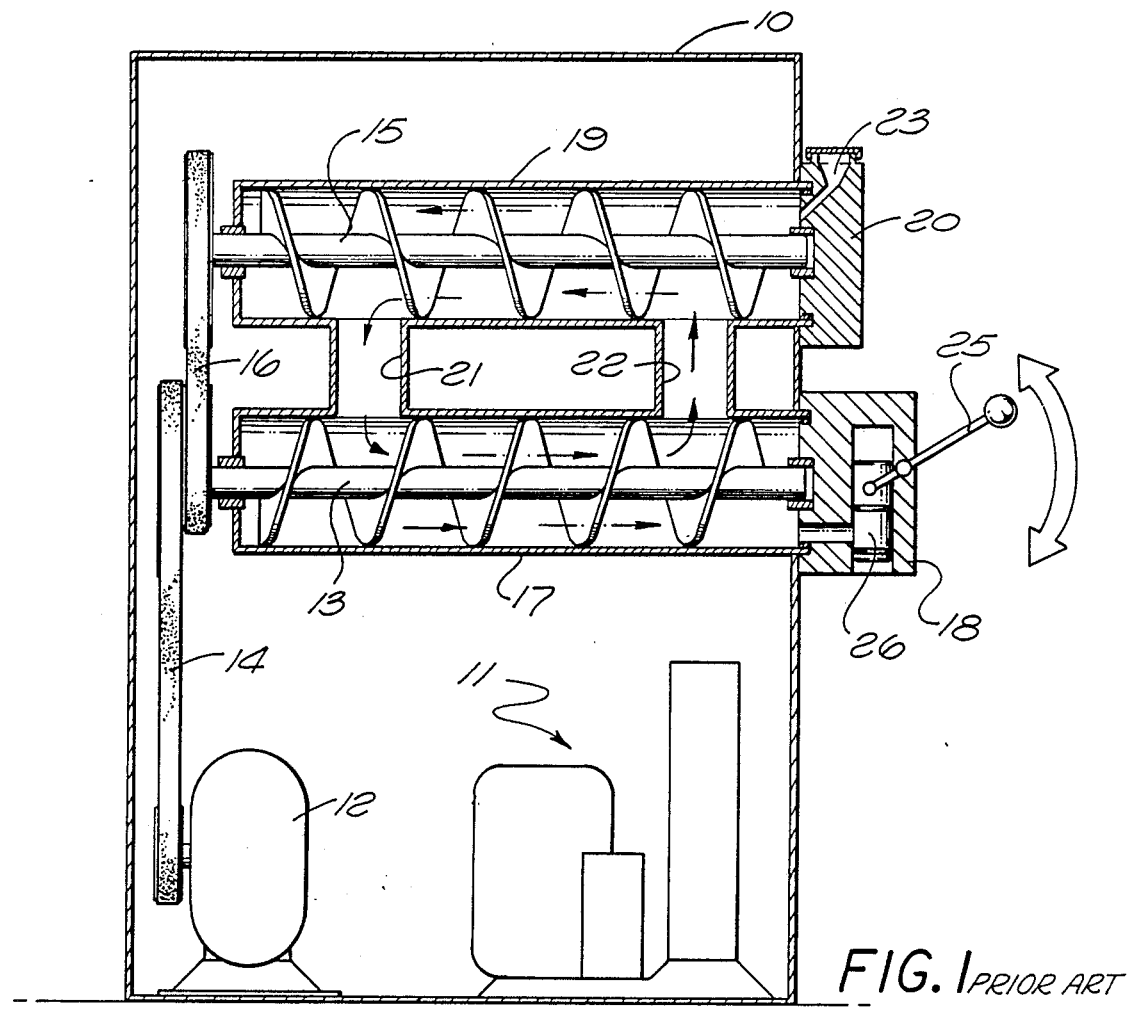
FIG. 1 is a side view, partly in section, of a prior art frozen beverage machine with dispensing valve.

The prior art slurry machine shown in FIG. 1 includes a housing 10 with a refrigeration unit 11 mounted therein. A motor 12 in the housing drives a first auger 13 through a belt 14, and a second auger 15 through another belt 16. The auger 13 rotates in a bushing carried in a freezer barrel 17 and in a bushing carried in a valve housing 18, and the auger 15 rotates in a bushing carried in a freezer barrel 19 and a bushing carried in a product inlet fitting 20. The freezer barrels 17, 19 are interconnected by a passage 21 and by another passage 22. Freezer coils (not shown) from the refrigeration unit 11 are positioned around the barrels 17, 19, and the liquid to be frozen is introduced at an inlet opening 23 of the fitting 20.

In operation, the two augers are driven continuously and provide a recirculating path for the liquid as shown by the arrows, to produce and maintain the liquid/ice mix or slurry. A quantity of the slurry is dispensed by positioning a container under the valve housing 18 and moving the handle 25 downward, raising the piston 26 up and permitting flow of the slurry outward through the valve into the container.

Figure 2:
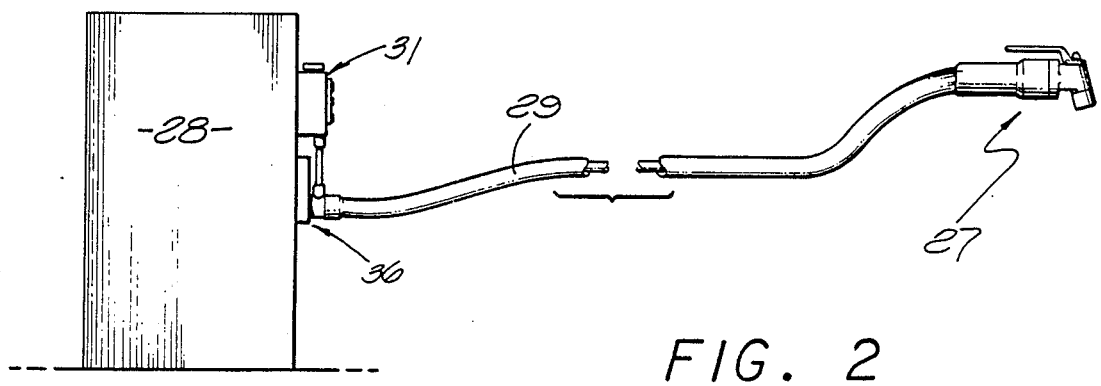
FIG. 2 is a side view of a frozen beverage machine with dispenser and incorporating the presently preferred embodiment of the invention.

The system of the invention is shown in FIG. 2, with a nozzle 27 connected to a freezing machine 28 by a line 29. The freezing machine 28 may be the same as the conventional machine described above in conjunction with FIG. 1, with the modifications to be described in conjunction with FIGS. 3 and 4.

Referring to FIGS. 3 and 4, an impeller housing 31 is mounted on the housing 10 in the same manner as the product fitting 20, and includes a bushing for supporting the auger 15. An impeller 32 is mounted within the housing 31 and is connected to the shaft of the impeller 15, typically by being threaded into a threaded opening of the shaft. The impeller may be installed in the housing through a cover plate 33. There is a flow path through the impeller housing from an inlet 34 to an outlet 35, with the impeller being positioned in this flow path.

A line housing 36 is mounted on the machine in place of the valve housing 18, and includes a bushing for support of the auger 13. The line housing 36 includes mounting plate 37a and a tee fitting 37 with the center arm 37a of the fitting connected to the inlet 34 of the impeller housing. An outer tube 38 of the line 29 is positioned on one arm of the tee, and an inner tube 39 of the line 29 passes through the tee and terminates at the mounting plate of the line housing.

The nozzle 27 is shown in greater detail FIGS. 5 and 6, and includes a housing 40 with a valve seat 41 carried in a nozzle outlet end 42 which is attached to the housing by a threaded nipple 43. A valve plunger 45 slides in an opening in the housing 40 and in an opening in a lever 46 pivotally mounted on the housing by a pin 47, with an O ring seal 48 positioned in a groove in the housing to provide a seal about the valve plunger. Typically the valve plunger is made in two or more parts, with an enlarged head 49 at the upper end and a tapered head 50 at the lower end for engaging the seat 41. A spring 51 is positioned about the plunger between the head 50 and the housing 40. In operation, the lever 46 is manually compressed at the left end as shown in FIG. 6 to compress the spring and move the valve plunger from the closed position of FIG. 5 to the open position of FIG. 6.

A sleeve 53 is carried within the housing 40, typically by having a threaded end which engages mating threads of the housing. One or more lateral openings 53a are provided in the sleeve 53. The tube 39 is attached at the other end of the sleeve 53, typically by sliding the tube over the end of the sleeve and maintaining it in position by a band 54. The outer tube 38 is mounted on the housing, as by positioning the end of the tube over a shoulder 55 and clamping it in place with another sleeve 56 threadedly mounted on the housing. Another O ring 57 may be used as a seal if desired. Typically the sleeve 56 is made of a tough rigid material such as a plastic molding or a metal tube, and provides the principal hand grip for the dispenser nozzle.

When the dispenser system of the invention is being installed on a conventional freezing machine, a plug 59 (FIG. 3) is positioned in the passage 22, and the impeller housing 31 and the line housing 40 are mounted in place of the fill fitting 20 and the valve housing 18, respectively, with the impeller 32 inserted into the auger 15. In some situations, the auger may need to be removed for drilling and tapping of the hole for receiving the impeller.

In operation, the valve at the nozzle is normally closed. The liquid to be frozen is poured in at the opening 23 with the refrigeration unit in operation and the motor 12 driving the augers. The liquid is continuously circulated through the barrel 19, the passage 21, the barrel 17, the inner tube 39, the outer tube 38, and the impeller housing 31. This continuous circulation produces and maintains the desired liquid/ice slurry. If the pumping head produced by the augers is sufficient to pump the slurry to the nozzle and return, the additional impeller may be omitted.

When the server desires to dispense a drink, the server picks up the nozzle, positions it at the container and presses down on the lever. When the plunger is raised, opening the valve, the slurry flows out of the nozzle into the container. When the server releases the lever 46, spring 51 pushes the valve plunger downward to the position of FIG. 5, shutting off dispensing of the slurry. The slurry continues to flow outward through the inner tube 39, through the bypass openings 53a, and return to the freezing machine through the outer tube 38.

With this arrangement, no thermal insulation is needed for the line 29, with the return flow of the slurry in the outer tube providing thermal isolation for the outgoing slurry in the inner tube. Also, since the inner tube is protected by the outer tube and since the maximum pressure differential between the inner tube and the outer tube is less than that between the outer tube and the environment, the inner tube may be constructed of an unreinforced relatively thin wall material. The outer tube preferably is constructed of a reinforced and relatively thick wall material. A typical inner tube is of relatively low cost vinyl with an outer diameter of $\frac{3}{4}$ inch and an inner diameter of $\frac{5}{8}$ inch. A typical outer tube may have a helical wire reinforcement and is of reinforced silicone which is flexible at low temperature with an outer diameter of 1 to 1 $\frac{1}{4}$ inch and of $\frac{1}{8}$ inch wall thickness.

I claim:

1. In a frozen beverage dispenser for use with a liquid/ice slurry machine having freezing means for freezing a liquid to form a slurry and circulating means for circulating the liquid through the freezing means, the improvement comprising in combination:

inner and outer concentric tubes forming a flexible line;
   a nozzle;
   first means for connecting said line to said nozzle; and second means for connecting said line to said machine to provide a slurry recirculating path between said circulating means and said nozzle;

aid nozzle including:
a housing with a flow path therethrough between an inlet and an outlet;
means for connecting said outer tube to said housing;
means for connecting said inner tube to said housing in communication with said flow path;
valve means in said flow path for controlling flow through said outlet; and
bypass means in said housing for providing flow from said inner tube to said outer tube; and
said bypass means including a sleeve carried in said housing in said flow path, with said inner tube connected to said sleeve, and with said sleeve having at least one lateral opening providing communication with said outer tube.

2. A dispenser as defined in claim 1, wherein said valve means includes:
a valve seat adjacent said outlet;
a valve plunger slidingly mounted in said housing for sealing engagement with said valve seat;
spring means for urging said plunger toward said seat; and
an actuator carried in said housing for moving said plunger away from said seat to provide fluid flow through said outlet.

3. A dispenser as defined in claim 2 wherein said inner tube is of an unreinforced relatively thin wall material and said outer tube is of a reinforced relatively thick wall material, with the wall thickness of said outer tube about four times the wall thickness of said inner tube.

4. In a frozen beverage dispenser for use with a liquid-/ice slurry machine having freezing means for freezing a liquid to form a slurry and circulating means for circulating the liquid through the freezing means, the improvement comprising in combination:
inner and outer concentric tubes forming a flexible line;
a nozzle;
first means for connecting said line to said nozzle; and
second means for connecting said line to said machine to provide a slurry recirculating path between said circulating means and said nozzle;
with said slurry machine including a motor driven auger for moving slurry, and for said dispenser further including:
an impeller housing for mounting on said machine and having a flow path therethrough in said slurry recirculating path; and
an impeller carried in said impeller housing for connection to said auger in impeller driving relation.

5. A dispenser as defined in claim 4 wherein said machine has a slurry outlet, and said dispenser further includes a line housing for mounting on said machine at said machine slurry outlet,
said line housing having means for connecting said line thereto, with said inner tube in communication with said machine slurry outlet and with said outer tube in communication with said impeller housing flowpath.

6. A dispenser as defined in claim 5 wherein said means for connecting said line to said line housing includes a mounting plate and a tee fitting, with opposed arms of said tee fitting connected to said mounting plate and said outer tube, and with the center arm of said tee fitting connected to said impeller housing, with said inner tube passing through said opposed arms to said line housing.

7. In a frozen beverage dispenser for use with the a liquid/ice slurry machine having freezing means for freezing a liquid to form a slurry and circulating means for circulating the liquid through the freezing means, the improvement comprising in combination:
inner and outer concentric tubes forming a flexible line;
a nozzle;
first means for connecting said line to said nozzle; and
second means for connecting said line to said machine to provide a slurry recirculating path between said circulating means and said nozzle;
with said slurry machine including a motor drive auger for moving slurry, and said dispenser further including:
an impeller housing for mounting on said machine and having a first flow path therethrough in said slurry recirculating path; and
an impeller carried in said impeller housing for connection to said auger in impeller driving relation; and
with said nozzle including:
a nozzle housing with a second flow path therethrough between an inlet and an outlet;
means for connecting said outer tube to said nozzle housing;
means for connecting said inner tube to said nozzle housing in communication with said second flow path;
valve means in said second flow path for controlling flow through said outlet; and
bypass means in said nozzle housing for providing flow from said inner tube to said outer tube.

8. A dispenser as defined in claim 7 wherein said bypass means includes a sleeve carried in said nozzle housing in said second flow path, with said inner tube connected to said sleeve, and with sleeve having at least one lateral opening providing communication with said outer tube.

9. A dispenser as defined in claim 7 wherein said machine has a slurry outlet, and said dispenser further includes a line housing for mounting on said machine at said machine slurry outlet,
said line housing having means for connecting said line thereto, with said inner tube in communication with said machine slurry outlet and with said outer tube in communication with said impeller housing flowpath.

10. A dispenser as defined in claim 9 wherein said means for connecting said line to said line housing includes a mounting plate and a tee fitting, with opposed arms of said tee fitting connected to said mounting plate and said outer tube, and with the center arm of said tee fitting connected to said impeller housing, with said inner tube passing through said opposed arms to said line housing.

11. In a frozen beverage dispenser for use with a liquid/ice slurry machine having freezing means for freezing a liquid to form a slurry and circulating means for circulating the liquid through the freezing means including a motor driven auger for moving slurry, the improvement comprising in combination:
inner and outer concentric tubes forming a flexible line;
a nozzle;
first means for connecting said line to said nozzle;

second means for connecting said line to said machine to provide a slurry recirculating path between said circulating means and said nozzle;

said nozzle including:

a nozzle housing with a first flow path therethrough between an inlet and an outlet, means for connecting said outer tube to said nozzle housing, means for connecting said inner tube to said nozzle housing in communication with said first flow path, valve means in said first flow path for controlling flow through said outlet, and bypass means in said nozzle housing for providing flow from said inner tube to said outer tube and including a sleeve carried in said nozzle housing in said first flow path, with said inner tube connected to said sleeve, and with said sleeve having at least one lateral opening providing communication with said outer tube;

said valve means including:

a valve seat adjacent said outlet, a valve plunger slidingly mounted in said nozzle housing for sealing engagement with said valve seat, with fluid pressure in said housing from said inner tube urging said plunger toward said seat, and an actuator carried in said nozzle housing for moving said plunger away from said seat to provide fluid flow through said outlet;

an impeller housing for mounting on said machine and having a second flow path therethrough in said slurry recirculating path; and an impeller carried in said impeller housing for connection to said auger in impeller driving relation.

12. A dispenser as defined in claim 11 wherein said machine has a slurry outlet, and said dispenser further includes a line housing for mounting on said machine at said machine slurry outlet, said line housing having means for connecting said line thereto, with said inner tube in communication with said machine slurry outlet and with said outer tube in communication with said impeller housing flowpath.

13. A dispenser as defined in claim 12 wherein said means for connecting said line to said line housing includes a mounting plate and a tee fitting, with opposed arms of said tee fitting connected to said mounting plate and said outer tube, and with the center arm of said tee fitting connected to said impeller housing, with said inner tube passing through said opposed arms to said housing.

* * * * *